(12) United States Patent
Julian et al.

(10) Patent No.: US 12,056,623 B2
(45) Date of Patent: Aug. 6, 2024

(54) JOINT PROCESSING FOR EMBEDDED DATA INFERENCE

(71) Applicant: NETRADYNE, INC., San Diego, CA (US)

(72) Inventors: David Jonathan Julian, San Diego, CA (US); Avneesh Agrawal, Bengaluru (IN)

(73) Assignee: NETRADYNE, INC., San Diego, CA (US)

( * ) Notice: Subject to any disclaimer, the term of this patent is extended or adjusted under 35 U.S.C. 154(b) by 0 days.

(21) Appl. No.: 17/670,189

(22) Filed: Feb. 11, 2022

(65) Prior Publication Data
US 2022/0164686 A1    May 26, 2022

Related U.S. Application Data

(63) Continuation of application No. 15/770,487, filed as application No. PCT/US2016/058723 on Oct. 25, 2016, now Pat. No. 11,250,335.

(Continued)

(51) Int. Cl.
| | |
|---|---|
| G06N 5/04 | (2023.01) |
| G06F 8/65 | (2018.01) |
| G06F 18/2431 | (2023.01) |
| G06F 18/25 | (2023.01) |
| G06N 3/08 | (2023.01) |
| G06N 5/043 | (2023.01) |

(Continued)

(52) U.S. Cl.
CPC ............... *G06N 5/04* (2013.01); *G06F 8/65* (2013.01); *G06F 18/2431* (2023.01); *G06F 18/25* (2023.01); *G06N 3/08* (2013.01); *G06N 5/043* (2013.01); *G06N 20/00* (2019.01); *G06V 30/2504* (2022.01); *H04L 67/34* (2013.01); *G06N 3/044* (2023.01); *G06N 7/01* (2023.01)

(58) Field of Classification Search
CPC ............ G06N 3/08; G06N 5/043; G06N 5/04; G06N 3/0895; G06N 3/09; G06N 3/091; G06N 3/092; G06N 3/094; G06N 3/096; G06N 3/098; H04L 67/34; G06F 8/65
See application file for complete search history.

(56) References Cited

U.S. PATENT DOCUMENTS

| | | |
|---|---|---|
| 10,460,600 B2 | 10/2019 | Julian et al. |
| 10,782,654 B2 | 9/2020 | Campos et al. |

(Continued)

OTHER PUBLICATIONS

International Search Report and Written Opinion in International Patent Application No. PCT/US2016/058723 dated Jan. 25, 2017, 12 pages.

*Primary Examiner* — Paulinho E Smith
(74) *Attorney, Agent, or Firm* — FOLEY & LARDNER LLP

(57) ABSTRACT

Methods and systems for joint processing for data inference in a vehicle-to-cloud communication system are provided. The method includes processing sensor data from a first sensor in a first vehicle using a first model at a first device, resulting in a first inference data. The first communication data derived from the first sensor data is sent to a cloud device, where it undergoes further processing using a second model to generate cloud inference data. Subsequently, the cloud communication data based on the cloud inference data is sent to a second device in a second vehicle from the cloud device.

17 Claims, 5 Drawing Sheets

Related U.S. Application Data

(60) Provisional application No. 62/246,595, filed on Oct. 26, 2015.

(51) Int. Cl.
  *G06N 20/00*   (2019.01)
  *G06V 30/24*   (2022.01)
  *H04L 67/00*   (2022.01)
  *G06N 3/044*   (2023.01)
  *G06N 7/01*    (2023.01)

(56) References Cited

U.S. PATENT DOCUMENTS

| | | | |
|---|---|---|---|
| 2005/0109959 A1 | 5/2005 | Wasserman et al. | |
| 2007/0090180 A1* | 4/2007 | Griffis | G06Q 10/06 235/375 |
| 2011/0149745 A1 | 6/2011 | Filho et al. | |
| 2012/0290511 A1 | 11/2012 | Frank et al. | |
| 2015/0324686 A1* | 11/2015 | Julian | G06N 3/08 706/25 |
| 2016/0217369 A1* | 7/2016 | Annapureddy | G06N 3/04 |
| 2016/0328644 A1* | 11/2016 | Lin | G06N 3/04 |
| 2017/0010618 A1* | 1/2017 | Shashua | G01S 5/0027 |
| 2017/0091619 A1* | 3/2017 | Towal | G06N 3/084 |
| 2019/0057314 A1 | 2/2019 | Julian et al. | |

\* cited by examiner

US 12,056,623 B2

JOINT PROCESSING FOR EMBEDDED DATA INFERENCE

CROSS-REFERENCE TO RELATED APPLICATION

The present application is a continuation of U.S. patent application Ser. No. 15/770,487 filed on 23 Apr. 2018, which is a U.S. National Stage Application of International Application No. PCT/US2016/058723 filed on 25 Oct. 2016, which designates the United States, and which claims the benefit of U.S. Provisional Patent Application No. 62/246,595, filed on the 26 Oct. 2015, and titled, "JOINT CLIENT AND CLOUD PROCESSING FOR MACHINE VISION", the disclosure of which is expressly incorporated by reference in its entirety.

BACKGROUND

Field

Certain aspects of the present disclosure generally relate to embedded data inference, and more particularly, to systems and methods for data inference with joint processing on an embedded client device and a second device.

Background

In embedded data inference applications, which may include embedded machine vision for automotive advanced driving assistance systems (ADAS), drone ADAS, car and drone auto-pilot control systems, drone analytics, and others, there are limitations on processing speed performance that may be due to the computational limitations of embedded systems. Sophisticated machine vision algorithms, which may include large neural network models, may provide better performance when compared with machine vision algorithms that may include smaller neural network models; however, the compute capabilities of devices running these algorithms may not be sufficient to process the sensor data as fast as it may be captured. As a consequence, an embedded data inference device that is processing a sophisticated model may not meet latency constraints of the machine in which it is embedded. For example, the machine may attempt to run a control loop that may guide its movements. As such, inclusion of the sophisticated model may not be suitable for inclusion in a control loop for the machine. In some cases, the memory capacity of the device might be lower than what is required by a particular machine vision algorithm, such that the device would not be able to run the algorithm as all. One potential solution may be to send all of the data captured by the sensors of the device to cloud computers. Cloud computers, alone or in aggregate, may be more powerful than the embedded compute processors available on any given device. This potential solution, however, may engender different obstacles, such as bandwidth and latency limitations, which may hinder the achievement of real-time processing.

Prior approaches to real-time computer vision have either accepted the performance limitations of embedded computing devices, or alternatively, limited the application of real-time computer vision to regimes that can tolerate the latency and bandwidth penalty associated with sending sensor data to the cloud. The present disclosure is directed to methods that may achieve real-time computer vision performance on a client computer, such as an embedded computing device configured to process machine vision algorithms.

SUMMARY

Certain aspects of the present disclosure generally relate to providing, implementing, and using a method of joint processing for embedded data inference. The system may be based on a device configured to perform data inference functions, such as machine vision functions, in conjunction with one or more devices, one or more of which may be in the cloud. With this system, a device may perform data inference functions while meeting processing time constraints that may not be achievable by the device operating without the assistance of a second device, or without the assistance of one or more devices on the cloud.

Certain aspects of the present disclosure provide a method of updating a model on a machine. The method generally includes a first memory unit; and a first at least one processor coupled to the first memory unit, in which the first at least one processor is configured to obtain sensor data; send communication data based on the sensor data to a second device; wherein the second device comprises a second memory unit; and a second at least one processor coupled to the memory unit, in which the second at least one processor is configured to determine a first model based on the communication data; send model information about the first model to the first memory unit; wherein the first at least one processor is further configured to update an embedded model based on the model information.

Certain aspects of the present disclosure provide an apparatus configured to update a model on a machine. The apparatus generally includes a memory unit and at least one processor coupled to the memory unit in which the at least one processor is configured to obtain sensor data associated with a context on a first device, send communication data based on the sensor data to a second device, determine a context specific model at a second device based on the communication data, send model information about the context specific model from the second device to the first device, and update an embedded model on the first device based on the model information.

Certain aspects of the present disclosure provide an apparatus for updating a model on a device. The apparatus generally includes means for obtaining sensor data at a first device, wherein the first device is embedded in the machine; means for sending communication data based on the sensor data to a second device; means for determining a first model at a second device based on the communication data; means for sending model information about the first model from the second device to the first device; and means for updating an embedded model on the first device based on the model information.

Certain aspects of the present disclosure provide a computer program product for updating a model on a device. The computer program product generally includes a non-transitory computer-readable medium having program code recorded thereon, the program code comprising program code to obtain sensor data at a first device; wherein the first device is embedded in the machine; send communication data based on the sensor data to a second device; determine a first model at a second device based on the communication data; send model information about the first model from the second device to the first device; and update an embedded model on the first device based on the model information.

Certain aspects of the present disclosure provide a method of joint processing for data inference. The method generally includes processing sensor data on a first device with a first model to create first inference data; sending first communication data based on the sensor data to a second device; processing the first communication data at the second device using a second model to create second inference data; and sending second communication data based on the second inference data from the second device to the first device.

Certain aspects of the present disclosure provide an apparatus configured to perform data inference. The apparatus generally includes a first memory unit; and a first at least one processor coupled to the memory unit, in which the first at least one processor is configured to process sensor data with a first model to create first inference data; send first communication data based on the sensor data to a second device; wherein the second device comprises a second memory unit; and a second at least one processor coupled to the memory unit, in which the second at least one processor is configured to process the first communication data using a second model to create second inference data; and send second communication data based on the second inference data to the first memory unit.

Certain aspects of the present disclosure provide an apparatus for data inference. The apparatus generally includes means for processing sensor data on a first device with a first model to create first inference data; means for sending first communication data based on the sensor data to a second device; means for processing the first communication data at the second device using a second model to create second inference data; and means for sending second communication data based on the second inference data from the second device to the first device.

Certain aspects of the present disclosure provide a computer program product for data inference. The computer program product generally includes a non-transitory computer-readable medium having program code recorded thereon, the program code comprising program code to process sensor data on a first device with a first model to create first inference data; send first communication data based on the sensor data to a second device; process the first communication data at the second device using a second model to create second inference data; and send second communication data based on the second inference data from the second device to the first device Certain aspects of the present disclosure provide a method of updating a machine learning model on a device. The method generally includes obtaining sensor data on a first device, processing sensor data on the first device with a first machine learning model to create first classification data, sending first communication data based on the sensor data to a second device, processing the first communication data at the second device using a second machine learning model to create second classification data, determining differences between the first classification data and the second classification data, and updating the first model based on the determined differences.

Certain aspects of the present disclosure provide an apparatus configured to update a machine learning model on a device. The apparatus generally includes a memory unit and at least one processor coupled to the memory unit in which the at least one processor is configured to obtain sensor data on a first device, process sensor data on the first device with a first machine learning model to create first classification data, send first communication data based on the sensor data to a second device, process the first communication data at the second device using a second machine learning model to create second classification data, determine differences between the first classification data and the second classification data, and update the first model based on the determined differences.

Certain aspects of the present disclosure provide an apparatus for updating a machine learning model on a device. The apparatus generally includes means for obtaining sensor data on a first device, means for processing sensor data on the first device with a first machine learning model to create first classification data, means for sending first communication data based on the sensor data to a second device, means for processing the first communication data at the second device using a second machine learning model to create second classification data, means for determining differences between the first classification data and the second classification data, and means for updating the first model based on the determined differences.

Certain aspects of the present disclosure provide a computer program product for updating a machine learning model on a device. The computer program product generally includes a non-transitory computer-readable medium having program code recorded thereon, the program code comprising instructions executable to obtain sensor data on a first device, process sensor data on the first device with a first machine learning model to create first classification data, send first communication data based on the sensor data to a second device, process the first communication data at the second device using a second machine learning model to create second classification data, determine differences between the first classification data and the second classification data, and update the first model based on the determined differences.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1A:
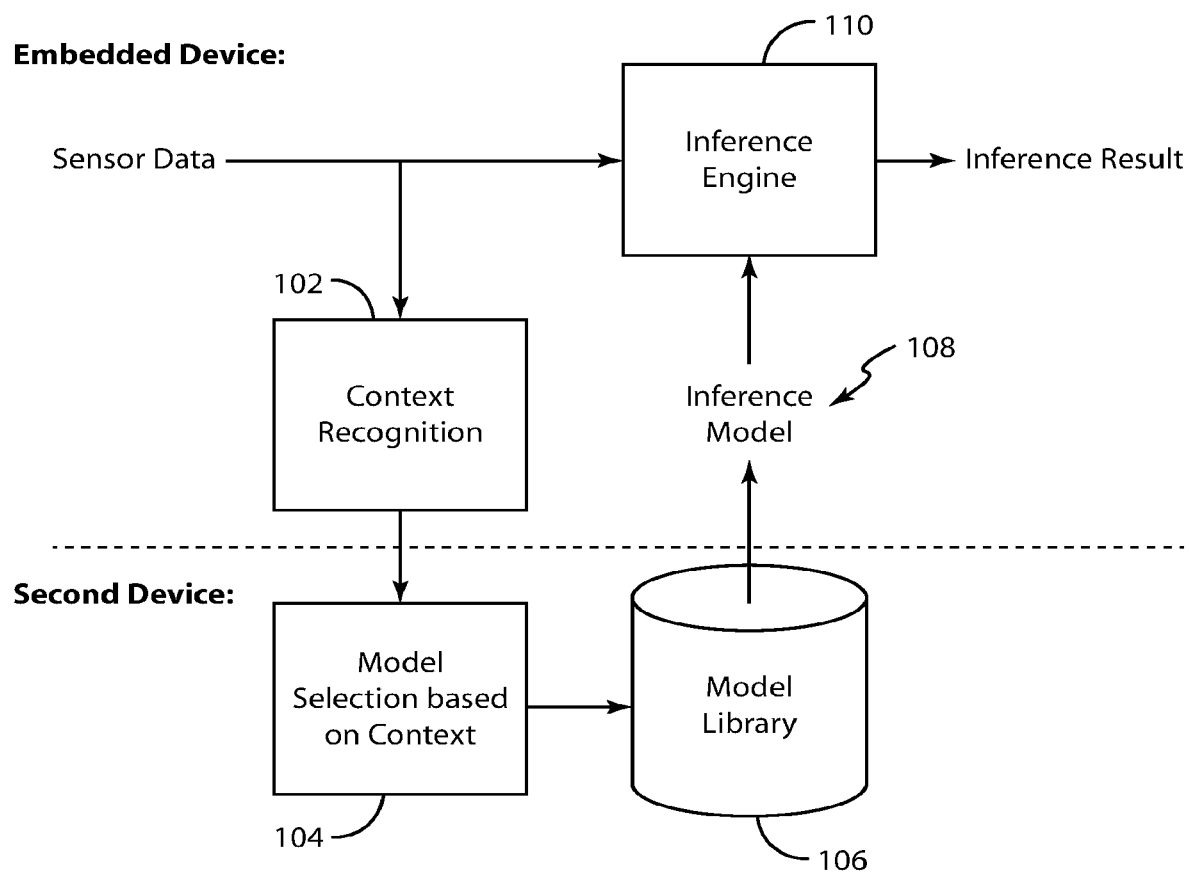
FIG. 1A illustrates an example of the cloud providing a context specific model in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Embedded data inference generally includes processing data that is collected on a device that is embedded within a machine. Based on an inference from the data, the machine may take some action. If the device is embedded in an autonomous vehicle, for example, an action based on an inference may be a command to alter the direction of motion of the autonomous vehicle. The action need not involve physical movements of the machine, however. In accordance with certain aspects of the present disclosure, the action may be a command to communicate data stored on the machine to a second device.

Embedded data inference may include computer vision processing. Computer vision processing may include models that are used to perform inferences by converting camera and other sensor data to class labels, location bounding boxes, pixel labels, or other inferred values. Models may be trained, may contain engineered feature detectors, or both.

Aspects of the present disclosure are directed to performing embedded data inference. In some applications, aspects of the present disclosure may enable real-time computer vision processing on embedded devices. According to certain aspects, real-time or near real-time computer vision processing may be achieved by leveraging a second device, which may be located near the first device, or which may be at a remote location (such as at a cloud computing facility). In some embodiments, the first device may send processed data or sub-sampled data to the second device, or to one or more devices in the cloud. In some embodiments, the second device or remote device or devices in the cloud may return additionally processed data or models that may be utilized on the embedded device to improve performance. Performance may include accuracy, latency, or other metrics.

Exemplary embodiments include the cloud providing context specific models, joint processing of the same function on an embedded compute device and on a second compute device, partitioning of a function across a first device which may receive input from a sensor and a second device which may receive input from the first device, unsupervised learning, and reinforcement learning.

Cloud Provides Context Specific Models

FIG. 1A illustrates an example implementation of the aforementioned method of data inference in which the context of the machine in which the device is embedded may be determined. As illustrated in FIG. 1A, processing performed on the embedded device 102 may determine or recognize the context of the machine and may provide this context to a second device. In this example, the second device may be located at a remote data processing center (the cloud), or the second device may be located near, on, or within the machine on which the first device is embedded. Based on the received information about the context from the embedded device, the second device may select 104 a context specific model from a model library 106. The second device may then communicate back a context specific inference model 108 for the client to use in a client inference engine 110. In some embodiments, the embedded inference engine 110 that is configured to use the context specific inference model 108 may achieve real-time processing performance.

Figure 1B:
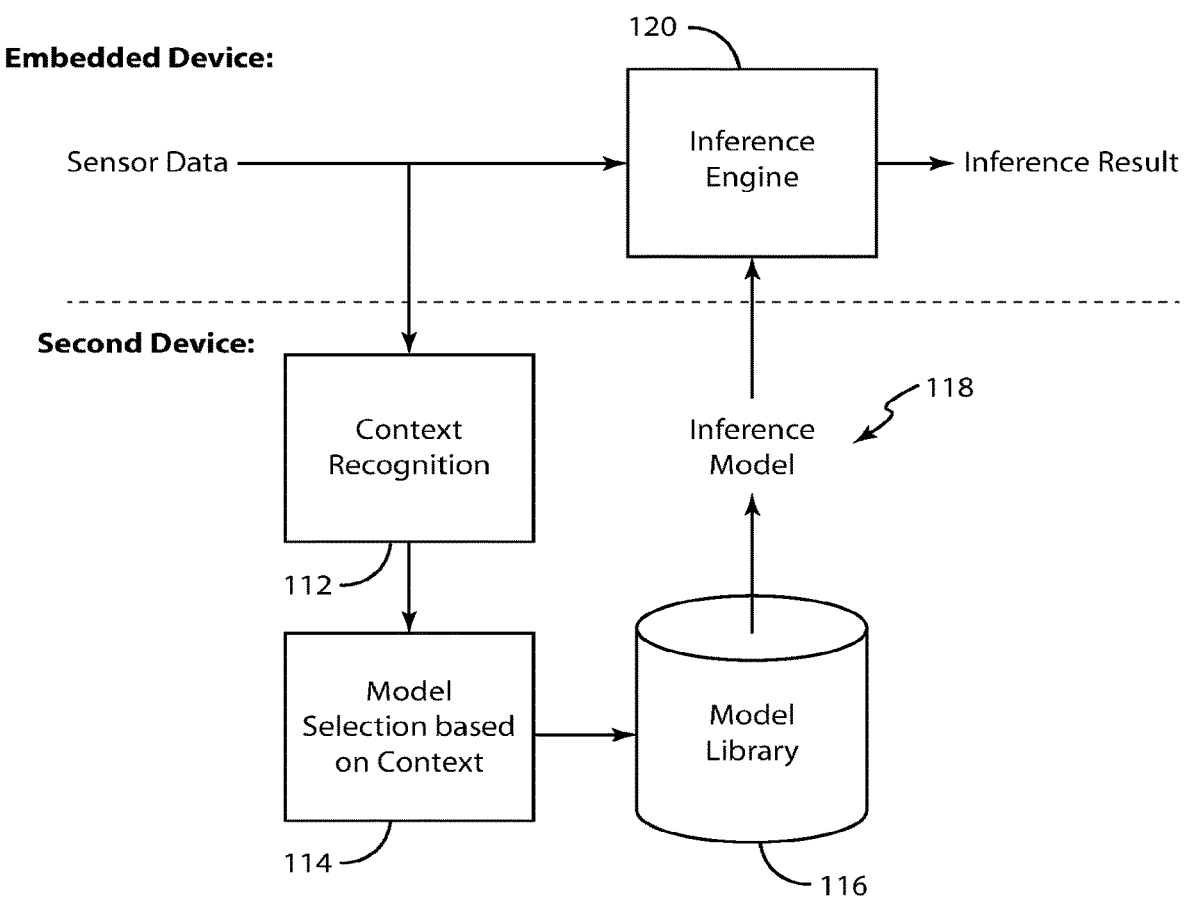
FIG. 1B illustrates an example of the cloud providing a context specific model in accordance with certain aspects of the present disclosure.

In an alternative embodiment, as illustrated in FIG. 1B, the embedded device may provide data to a second device. As in the example illustrated in FIG. 1A, the second device may be located at a remote data processing center (the cloud), or the second device may be located near, on, or within the machine on which the first device is embedded. In the example illustrated in FIG. 1B, however, the second device may determine the context of the machine in which the first device is embedded 112. Based on the context inferred from data provided by the embedded device, the second device may select 114 a context specific model from a model library 116 that is may be stored on the second device or on another device in the cloud. The second device may then communicate back a context specific inference model 118 for the embedded device to use in an embedded data inference engine 120. In some embodiments, the embedded inference engine 120 that is configured to use the context specific inference model 118 may achieve real-time processing performance.

In an exemplary embodiment of the aforementioned method of embedded data inference, a car or drone data inference device that is part of an advanced driving assistance system (ADAS) or auto-pilot system, or a drone or other real-time analytics system may be configured to process a general purpose machine vision model or set of models for recognizing objects of interest. A general-purpose model may be a model that has been designed or trained to operate in any context or in a wide range of typical contexts. The processing of a general-purpose model may provide the embedded device with a first level of performance. Furthermore, the general-purpose model may be processed on the embedded computing device so that the machine may operate if the device does not have a reliable connection to the second device. As a result of processing various sensor and user profile inputs, including camera, inertial sensors, GPS/GLASNOSS, microphone, user inputs, engine data, barometric pressure, and other data, the embedded device (for example, as illustrated in FIG. 1A) and/or the second device (for example, as illustrated in FIG. 1B) may recognize or infer the context of the embedded device. In one embodiment, the second device may use the recognized context to determine a context specific model, and then send the embedded device the context specific model to improve key performance indicators in that context such as accuracy and latency.

Aspects of the present disclosure may be directed to visual analytics. For example, a roof inspecting visual system may be embedded in a drone or a camera on a pole. The system may be configured to process a general context non-specific model to inspect typical roof conditions. The client may recognize the context of the type of roof, such as that the roof is a southwestern clay tile roof. The client may further recognize that the roof is currently wet, and may further recognize the brand of tile. According to certain aspects of the present disclosure, the embedded device may send visual inference data to a second device, which may be nearby or in a remote location (the cloud). The second device may have a library of models for different types of roofs in various weather conditions, or the second device may access such a library from a remote data center. A model may be selected from the library based on the context of the recognized roof type and weather conditions. The selected model, which may have been trained for the currently detected type of roof or for a similar type of roof, may then be sent back to the embedded device. The context-specific model may then be processed on the embedded device, either in addition to or in place of the general non-specific model, and may provide improved accuracy while keeping the model size for memory and computation small for embedded processing. In this example, aspects of the present disclosure may enable an operator to know where to allocate time inspecting the roof for issues, as described in more detail below.

As in the above example, certain aspects of the present disclosure may be used to direct the movements of a machine in which an embedded device resides. For example, certain aspects may cause the machine to scan a physical location in more detail. Alternatively, or in addition, certain aspects of the present disclosure may be used to direct the embedded device to scan a time period of recorded data in more detail. In one example, a selected model that is sent to an embedded device may cause the embedded device to process stored data. Based on an inference of the selected model on the stored data, some of the stored data may be sent to the second device for additional processing.

According to certain aspects of the present disclosure, a car ADAS system may send camera and other sensor data to a cloud server that may recognize the car context. For example, the cloud may recognize that the client is embedded in a car that is driving in snow in Germany based on GPS and camera inputs. The cloud may select a context specific model tuned for the types of signs found in Germany and their appearance in snowy conditions, and send it to the embedded device (which may be considered a client device) for real-time processing.

Although FIG. 1A and FIG. 1B show that the context may be inferred from sensor data collected at the embedded device, the present disclosure is not so limited. Alternatively, or in addition, the context may be based on a number of inputs including the outputs of processing of sensor data including cameras, inertial sensors, GPS, light sensors, barometers, temperature, LIDAR, and sonar; based on weather determined either from sensors or cloud sources such as weather reporting sites, map geography, and so forth. Furthermore, the context may be determined based on the computational resources available on the client as well as latency requirements on the embedded system. The context may be determined using different inference processing engines including Deep Neural Networks, Random Forests, Support Vector Machines, and others. The context may be a specific context, such as a clear sunny day with dry roads, or it may be a probability. The context may also be a feature vector from the output of a context recognition engine, or may be a feature vector from the embedded inference engine, or may be internal parameters of the context recognition engine or inference engine. For example, internal parameters may include the activation levels of neurons in a fully connected layer before the classifier layer in a deep neural network. A feature vector representation of the context may enable the second device, which may be a cloud server, to expand the model library over time, as it encodes more detailed and relative information and could be used to recognize additional classes that the client network cannot classify or cannot classify reliably.

In another embodiment of the aforementioned method of embedded data inference, context recognition may be based on the output of the inference engine, rather than the sensor data directly, or based on a combination of the sensor data and the output of the inference engine on the device. Considering the ADAS example described above regarding a car driving in Germany, the location of the car may be determined from GPS, which may be a type of sensor data, and the context of the car's location may be used by a second device to select a context-specific inference model that may indicate the type of signs, lane markings, and cars to expect on the road. Alternatively, or in addition, inference from the visual system could be used. For example, the inference engine may compute a feature vector that includes a description of various traffic signs recognized and located in the visual field. This feature vector could be sent to the second device, where a model may further recognize that the feature vector contains traffic signs associated with Germany. The second device may use this information as the basis for selecting a context-specific model to send back to the client. Likewise, an embedded visual sensor, such as a frame-based or an event-based camera, may indicate the weather conditions and traffic congestion. Audio processing may also indicate relevant features such as engine status and congestion.

Figure 2:
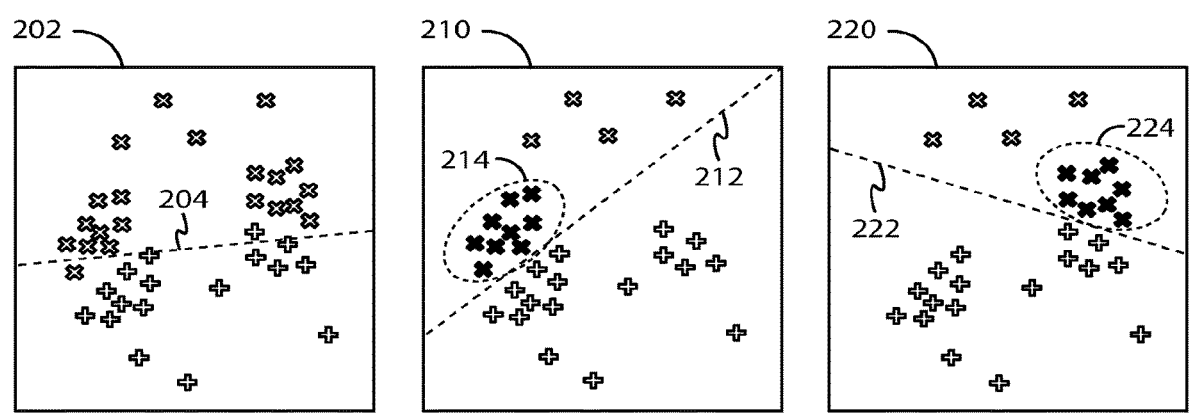
FIG. 2 illustrates an example of adjusting a threshold based on a determined context in accordance with certain aspects of the present disclosure.

FIG. 2 illustrates an example of adjusting a threshold of a classifier based on a determined context, in accordance with aspects of the present disclosure. Feature values associated with two classes are shown as white x marks and gray plus marks in the panels of FIG. 2. In 202 a threshold 204 is shown that may be used to distinguish objects belonging to the first class and the second class. The first class may contain examples of road signs in Germany, and the second class may contain examples of traffic lights. The two axes indicate how well a particular object matches a first and a second feature, respectively. The set of German road signs that were observed in snowy conditions may be grouped together 214. Likewise, the set of German road signs that were observed in sunny conditions may be grouped together 224. If the context is recognized as snowy, then the classifier shown in 210 may be used. This classifier may ignore previously observed data associated with sunny conditions 224, and may therefore adjust the decision boundary 212 so that better accuracy may be achieved in the present snowy context. Conversely, if the context is recognized as sunny, then the classifier shown in 220 may be used. This classifier may ignore previously observed data associated with snowy conditions 214, and may therefore adjust the decision boundary 222 so that better accuracy may be achieved in the present sunny context.

A model library, such as the model library 106 depicted in FIG. 1A, may be static or dynamic. In the static case, there may be sets of inference models pre-trained from different training sets of data. An inference model may specialize for different contexts and may be associated with a context indication. According to certain aspects of the present disclosure, the context indication may be a set of class labels the model knows, the set of images or inputs the model was trained on, or a set of feature vectors from training images. Several ways of determining the context are contemplated. In one embodiment, the context may be a scene level classification, and the model library may be a model or set of models for each scene label. In another embodiment, the context may be a geographic location, and the model library may be a model or set of models for each geographic location. In yet another embodiment, the context may be a feature vector or a set of feature vectors from processing a deep neural network associated with the client general inference engine or a context engine on the client or in the cloud. If the context is a feature vector, the distance may be computed to representative images associated with the different models of the model library. The model with the closest distance to the feature vector could be selected. If the context is a set of feature vectors, the model with the closest average distance to each of the feature vectors could be selected.

In the dynamic model case, a context specific model may be created during the operation of the aforementioned method of embedded data inference. In one embodiment, a second device may train or trim down a trained model to create a context specific model. To achieve real-time performance, an embedded device may run a model that is smaller than a general purpose model that may perform well in a wide variety of contexts but that may be too large to run in real-time on the client. While the general purpose model may be trainable and executable on the second device, which may be a cloud server, computational, memory, and or power limitations in the embedded device may not be sufficient for running the general purpose model on the embedded device such that the embedded device could also meet use-case specific latency and computation constraints. The context information used to determine the trimming of a model in the dynamic model case may include information about the computational resources and latency requirements of the embedded device to help select or build a model. Compared with accessing static models, dynamic models may take longer to construct, and therefore may not be desired during time critical phases of operation. On the other hand, in comparison with a static model library, a dynamic model library may have the capacity to construct more types of models and may therefore achieve a better context fit compared with what may be available in a static model library with a comparable allocation of storage space on the second device, which may be a cloud server.

There are several means for dynamically constructing models that are contemplated. In one embodiment, a context may be mapped to a class or training image set. Compared with a fully trained model, a class or training image set may take up a small amount of disk space. For example, a training set may comprise a list of classes or training image sets. Such a list may be smaller than all of the model parameters of a model trained on the training set. In the present example, a context specific dynamic model may be created by determining the context class or training set, and then training the model based on that class or set. The model trained in this manner may start as a pre-trained model. The training of the context specific model may comprise fine-tuning of the full stack of the model, or may be focused on a portion of the model, such as the classifier portion.

In another embodiment, context objects may be recognized from the sensors and then combined with past knowledge to specify how a new context specific model may be created. A model may be created by fine-tuning an existing model, or otherwise deriving a model from another model. Context objects may be recognized from sensors such as vision or audio. Combining past knowledge may be achieved through the use of a co-occurrence matrix of different class types. The co-occurrence matrix may be encoded either as a matrix or an energy function such as a conditional random field. The co-occurrence matrix may associate the recognized objects with objects that are not currently observed, but that have been observed to co-occur frequently with the recognized objects. Based on the recognized objects and the likely but un-observed objects, a set of classes may be identified. For example, the set of classes that are identified could be ones for which the co-occurrence matrix value (or values) relating to the co-occurrence likelihood of each class and the observed object (or objects) exceeds a threshold. The union of observed objects and co-occurrence objects may then form the set of classes or training images upon which to train a context specific inference engine. In addition, there may be a baseline set of classes or training images added either explicitly or implicitly by setting high co-occurrence values with all baseline class objects in the co-occurrence matrix. This dynamic set may then be used to construct a context specific training set and train the context specific model. The dynamic approaches identified above may be used together. Additionally, a first dynamic library approach could be used to select a baseline set of classes to add to a second dynamic library approach. Furthermore, a window of context data may be used to ensure that the recognized objects that form the basis of the context determination are relevant to the current operating conditions.

In another embodiment of the aforementioned method of embedded data inference, updating a model on the client device may involve a cloud server, which may be a nearby device, sending a signal to effect a model change on the embedded device rather than sending a new model. Compared with sending a new model, this embodiment may save bandwidth from the cloud to the client. Examples of sending a signal to effect model change may include indicating parts of the inference engine on the client that should not be computed. For example, in the case that the client is configured to run a deep neural network, there may be sets of nodes, layers, branches, and/or classes that are signaled to turn on or off based on the inferred context. Layers of a deep neural network may include parallel concatenated layers. The context that forms the basis for which portions to turn on or off may incorporate a tradeoff of accuracy for different classes and computational latency. Alternatively, the cloud could signal a level of dropout or drop-connect to use during inference. The dropout or drop-connect may utilize patterns instead of dropping or connecting a random set of connections within the neural network. The patterns of dropout or drop-connect may correspond to compute operations in the GPU, CPU, or DSP, to provide computational speedups. For example, eliminating a full filter or a node in the computations may speed up the overall computation of the inference engine. During operation, it may be observed that in certain inference environments, such as daylight, a desired target accuracy may be achieved with less network capacity compared with the network capacity required to achieve similar target accuracy in other inference environments, such as moonlight. As a result, computations during daylight may be faster than computations during moonlight for the same or similar level of target accuracy. The faster computations may be used to support faster driving or flying speeds, or may support additional analysis. In more difficult inference environments, such as darker stormier settings, more network capacity may be utilized to achieve a desired target accuracy. As a consequence, the inference times associated with minimum acceptable target accuracy may entail lower top driving or flying speeds.

According to aspects of the present disclosure, an embedded device may use local data to fine-tune or modify a context specific model received from a second device. During operation of the aforementioned method of embedded data inference, the embedded device may locally store context specific or device specific training data that may not be available in the second device. The local data may not be available in the second device, which may be a cloud server, due to bandwidth, storage, latency limitations, or other reasons. For example, a car ADAS system may have local training data from common home to work driving paths. These data may contain new views of objects that were recognized in the past based on joint processing with the second device. The labels obtained in the past from the second device may be used in conjunction with the new views of the same objects to fine-tune the inference model on the embedded device. An embedded device may also locally store embedded device-specific training sets to train additional classes of relevance to the embedded device. For example, a device that is embedded in a car may store training sets related to whether the engine is healthy or not.

Embedded devices that are near each other (such as devices embedded in cars that are driving along the same road) may recognize similar contexts. Accordingly, in accordance with certain aspects of the present disclosure, the same or a similar inference model may be communicated from a second device. In an embodiment in which the second device is a cloud server, the same cloud server may act as a second device for multiple embedded devices. In these embodiments, it may sometimes be desirable for the cloud server to communicate the same model, or an averaged model, to multiple embedded client devices at the same time. The cloud server in these examples may more efficiently communicate to nearby embedded devices using a broadcast or multi-cast type channel which may save air interface bandwidth. This communication approach may have an advantage that as, for example, packs of cars drive along the same road change contexts together at the same boundaries, there may be repeated bandwidth efficiencies at each boundary change from having the context specific models communicated concurrently.

Other forms of bandwidth and computation efficiency are also contemplated. In one example, there may be multiple cars on a road, each car having an embedded device configured according to certain aspects of the present disclosure, and each car also having a second device that is located near the embedded device. For example, the second device may be a GPU-based deep learning accelerator that is in the same car as the first device, and the second device may communicate with the embedded device via a Bluetooth, WiFi, or via a wired connection, and the like. In this example, the multiple cars may approach a change of context, which may be a construction zone, in a sequence. The second device for the first car to approach the construction zone may determine a model update for its associated embedded device. The second device for the first car may also determine that a second car is traveling in the same direction behind it, and the second device from the first car may communicate the same model update to the embedded and or second device in the second car, or may communicate information about the inferred context.

Additionally, in a multi-client case (such as multiple cars, each with an embedded device), a cloud server may act as the second device for each car, and the cloud server may combine context estimates across nearby clients, where nearby clients could be determined based on GPS location, visual identification, and/or other means. The cloud may average context feature vectors or probabilities from nearby clients to get a more accurate context estimate. Alternatively, or in addition, the cloud could use images from multiple embedded devices to compute a joint context estimate.

Further, in a multi-client case, a cloud server may use predictive analytics to anticipate the client context and then provide the context specific model ahead of the recognized context change. The context specific model may be sent with an indication of when it should become active. For example, if a car is driving along a road, the cloud may determine the car's location based on GPS, visual cues, or other means and may use tracking and predictive analytics to predict the car will be transitioning to a new context in 10 minutes based on other cars reported context at the point corresponding to 10 minutes ahead. The context from cars at that future location may be used to determine the context specific model which is sent to the client car along with a GPS coordinate, time value, sensor cue, or other activation signal for when to switch to the new context specific model.

In another example involving a multi-client case, a cloud server may identify a geographical region of interest on a road. For example, the cloud may determine that there is an obstacle in the road, such as road debris. As above, if multiple cars are driving along a road, each with an embedded device configured according to certain aspects of the present disclosure, the cloud may send an updated model that is better suited to identifying the road debris (or maneuvering around road debris in the case of a control loop model) to embedded devices in cars that may pass by the same location. Alternatively, or in addition, the cloud server may communicate to embedded devices in cars that may pass by the same location a request that all or some of the sensor data associated with the geographical region of interest be sent to the cloud for additional processing. In addition, the cloud may communicate a model to embedded devices in cars that already passed the geographical region of interest to re-process recorded data with the new model (which may be adapted to road debris). In some cases, the data inference of the new model may cause the embedded device to send all or some of the recorded data associated with the identified geographical region of interest.

Joint Processing on an Embedded Device and a Second Device

Figure 3:
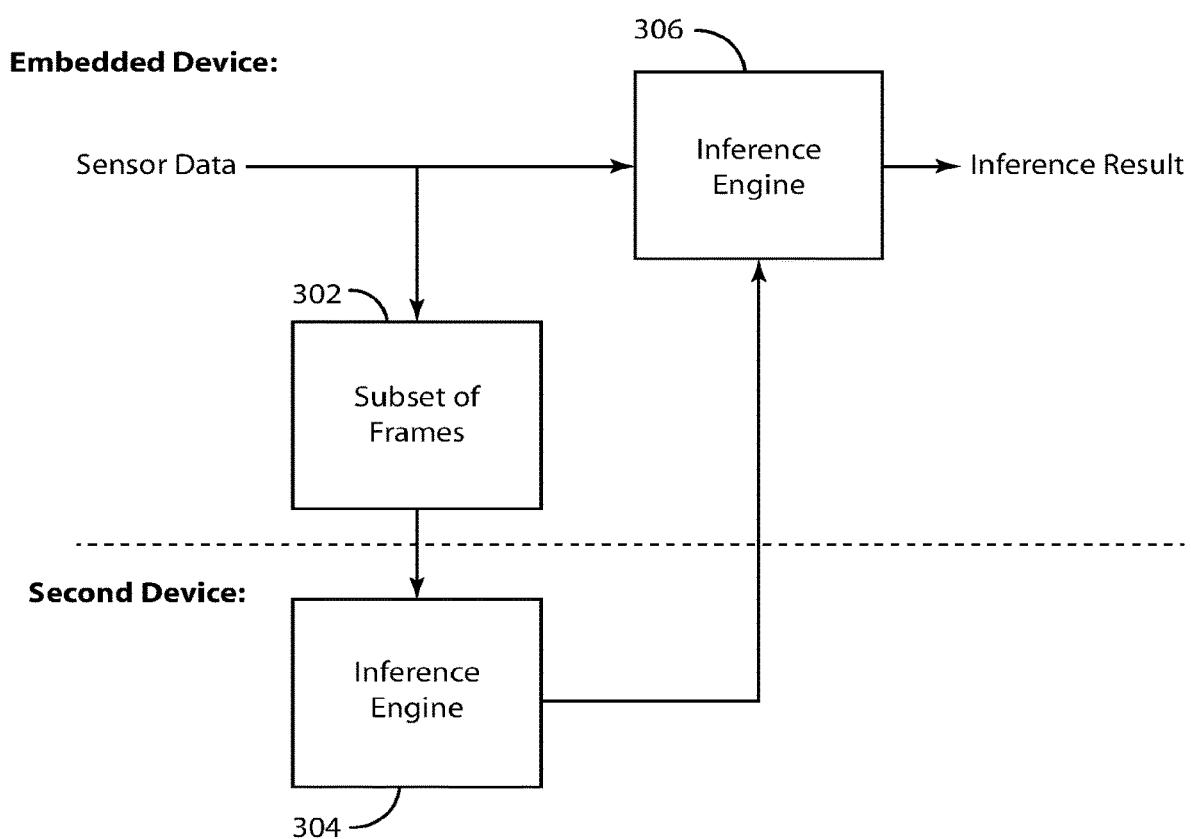
FIG. 3 illustrates an example of joint client and cloud processing in accordance with certain aspects of the present disclosure.

According to aspects of the present disclosure, an embedded device and a second device may jointly process data obtained at the embedded device. FIG. 3 illustrates a method of joint processing in accordance with certain aspects of the present disclosure. The sensor data may be segmented into a subset of frames 302. The subset of frames may be sent the second device where it may be processed by an inference engine 304. The results of the inference engine may then be sent back to the embedded device. Concurrently, the sensor data obtained on the first device may be processed locally at an embedded inference engine 306. The results from the second device may be combined with the results of the embedded inference engine on the embedded device to obtain the inference results that may be used by the machine in which the embedded device resides. In the present example, the second device may provide additional computation resources to those at the embedded device. There may be a latency penalty associated with the inference result from the second device. Aspects of the present disclosure are directed to leveraging the computation resources of the second device, which may be a cloud server, and meeting the real-time processing, latency requirements of the embedded device. Several methods of leveraging the additional computational resources of a second device, which may be one or more devices on the cloud, are contemplated, as described below.

As an example, in a car or drone ADAS, the inference engines on an embedded device and on a second device may be detecting objects and their locations in the field of view of the machine in which the embedded device resides. The detected objects may include pedestrians, road signs, or other cars or drones. In this example, a full image search to find potential objects may take more computational resources and time than tracking already located objects. The embedded device without assistance from a second device may be able to support a couple of frames per second of full image search, while it may be able to track already located objects at 30 frames per second. The second device may have the capacity to perform image search at a higher frame rate (such as 15 frames per second), at a higher accuracy (based on a more computationally expensive model), or both. In this example, a sub-set of frames may be sent to the second device. This sub-set of frames may actually be all of the frames. The present disclosure is not limited to processing of video frames. A frame may include video data. A frame may also include other data types, such as segments of audio, GPS readings, and the like.

In an object tracking application, the second device may process the received frames and send the results back to the embedded device. There may be added latency compared with results processed on the embedded device. In some embodiments, the embedded device may combine the inference data from the second device with the inference data from the embedded device. In an object tracking example, the embedded device may update the object tracking to add additional objects found by the second device. In addition, the embedded device may adjust tracked object locations based on object locations determined by the second device.

Furthermore, in one configuration, the data from the second device, which may be a cloud server or which may reside nearby, may be used to fine-tune detection thresholds on the embedded device. Detection thresholds may be adjusted according to a desired tradeoff of recall and precision, and may obtain a new operating point for the current environment or context. For example, the second device may provide an outer loop precision and recall measurement to adjust thresholds up or down.

According to aspects of the present disclosure, an embedded compute engine and a second compute engine may use the same inference engine for full search, each at a number of frames per second. In this example, a first subset of frames may be selected for processing on the second compute engine. The results of the processing on the second compute engine may be combined with the results from a second subset of frames selected for processing on the embedded compute engine so that the joint system may achieve a higher effective frame rate. In this example, the first and second sub-sets of frames may partially overlap.

Referring to the embodiment of the present disclosure directed to object tracking, the object tracking filter may be a temporal filter such as a Kalman Filter, Complementary filter, Extended Kalman Filter, Recurrent Neural Network or other type of tracking filter. Furthermore, the inference results from the cloud and client may be fed to the filter. In some cases, the different inference results may be associated with different levels of confidence or noise.

The present disclosure is not limited to detecting and locating objects. According to aspects of the present disclosure, the cloud may send class labels to an embedded device, or may send fine-grained information such as class probabilities or scores, neural network feature vectors, and the like. Such information may be input into tracking filters. In an embodiment in which the second device returns feature vectors, a feature vector may be input into a recurrent neural network tracking filter. Alternatively, a feature vector may be concatenated with a feature vector computed by the embedded device and may be used in a pre-trained classifier to improve the joint accuracy. The feature vector of the embedded inference engine may be based on different information compared with the second device. For example, the embedded inference engine may be based on higher resolution information or additional sensors to determine the feature vector state. In this example, the second inference engine may be based on a more complex and sophisticated model compared with the model on the client device, but the second inference engine may be based on relatively lower resolution images due to communication bandwidth constraints.

Aspects of the present disclosure may be directed to controlling communication bandwidth utilization. For example, the number of frames per second sent to the second device, which may be a cloud server, for processing may be dynamically set based on the performance of the embedded device. A first-order tracking loop may be used that may increase the rate of frames sent when the client and cloud labels and locations disagree. Likewise, there may be a reduction of the rate of frames sent when the embedded and second inferences agree. Alternatively, lookup tables may be used instead of a first-order tracking loop to dynamically set the rate of frames sent. In addition, inference engine scores, such as probabilities, from either the embedded device or the second device may be used to dynamically adjust the rate of frames sent to the second. For example, if the embedded device probabilities are close to threshold then more frames may be sent to the second device, while if the decision values show a substantial margin, then fewer frames could be sent. The present disclosure is not limited to dynamically setting the rate of sending data frames to a second device. According to aspects of the present disclosure, the rate of sending other types of information, such as context information, from an embedded device to a second device may be dynamically adjusted.

In an embodiment of the present disclosure, a cloud and a client device may be searching for complementary sets of classes. For example, in a real-time drone analytics use case the client may be embedded within a drone that is searching for coarse types of classes, such as different types of agricultural crops and whether or not they are healthy, while the cloud may be performing a fine grained classification of the type of crop and type of health issue.

Figure 4:
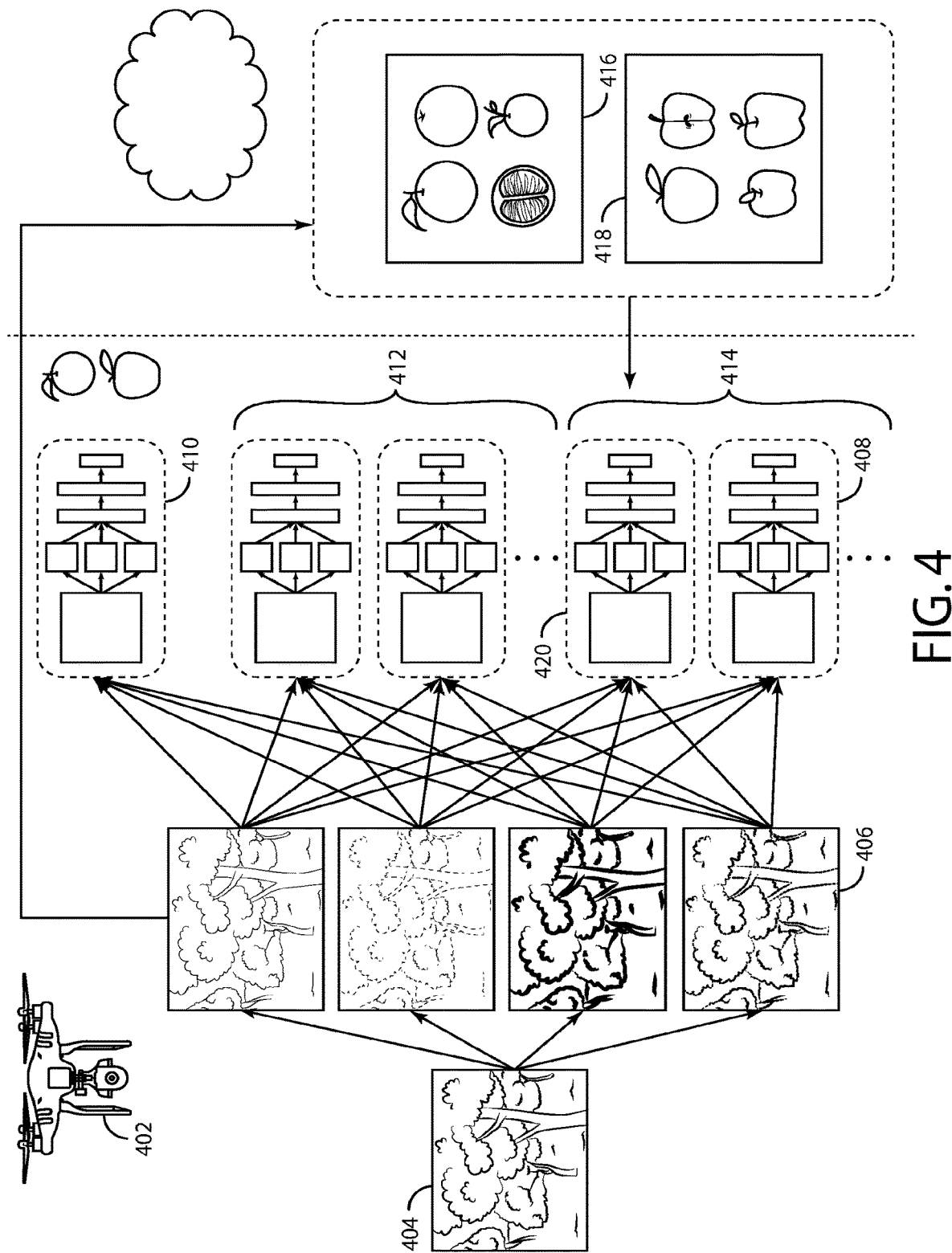
FIG. 4 illustrates an example of joint client and cloud processing in accordance with certain aspects of the present disclosure.

FIG. 4 illustrates an embodiment of the present disclosure in which a client device and the cloud perform complementary classification tasks. A camera 402 affixed to a drone may collect sensor data. For example, the camera may collect an image of an apple tree 404. The image of the apple tree may be processed on the drone device by a deep neural network. The deep neural network may include a convolution layer 406 as well as a set of parallelizable networks within the network 408. One such network may be an apples vs. oranges classifier 410. Other networks on the drone device may include networks specialized at recognizing disease states for various type of orange trees 412. Still other networks on the drone device may include networks specialized at recognizing disease states for various type of apple trees 414. Data relating to the classification of apples vs. organizes may be sent to a device or devices on the cloud. A first device on the cloud may be configured to process a large network trained to classify a particular variety of orange 416 based on an image of an orange tree. A second device on the cloud may be configured to process a large network trained to classify a particular variety of apple 418 based on an image of an apple tree. In the present example, the data sent from the drone to the cloud may be processed by the cloud device configured to process the network that classifies oranges 416. After classifying the image as belonging to a particular variety of orange, the cloud may then send the label of that particular type of orange back to the drone. The drone may then use that class label to selectively process the network on the drone that is trained to detect disease states of the corresponding type of orange 420. Likewise, the drone may turn off execution of all other networks trained to classify disease states of apples 412 or disease states of oranges 414 that are not the identified variety.

The present disclosure is not limited to sending data from the client to the cloud at fixed or dynamically set time intervals. According to aspects of the present disclosure, the client may also use event triggers instead of, or in addition to, uniform sampling for sending information to the cloud. The use of event triggers to direct data to the cloud may improve performance. Event triggers may relate to the spatial location of perceived objects. Examples of spatial event triggers include triggering on an anomaly. For example, a client camera may observe a manhole cover and detect an anomaly, such as a change the in the spatial location of the manhole cover. In this example, the triggering event may initiate sending an image to the cloud for additional classification. The cloud may then detect the sewer overflowing and send this information back to the client, which may initiate changes to the processes controlling navigation on the client device.

The present disclosure is not limited to event triggers that are based on sensor data obtained at the client. According to aspects of the present disclosure, an event trigger may be the time of day. In an embodiment of the present disclosure, a time-of-day trigger may be used to trigger coordinated sampling among nearby clients with cameras providing different views of an area. This may be used so that the clients sample the area concurrently to facilitate joint processing. Alternatively, the clients may stagger their sampling to preserve client battery life, or to load balance network bandwidth and cloud loads. The amount of concurrent or staggered sampling may be based on a desired number of different views or to a target level of sampling of an area. In an embodiment of the present disclosure, a client may send a video burst at a sample time, such as a 1-minute chunk of data at noon. Sending a video sample burst, in conjunction with other video sample bursts from the same or other clients, may facilitate cloud processing of temporal attributes of an environment. For example, the cloud may count the number of cars in an intersection or the number of pedestrians and their rates of movement.

According to aspects of the present disclosure, event triggers may be based on the detection of client side performance reaching a specified limit. For example, a pedestrian tracking client inference pipeline may be able to detect and track 20 people while maintaining real-time latency targets. An inference pipeline may be an inference engine that is segmented into sequential processing stages based on data dependencies between the processing steps. If the processing time of a stage of an inference pipeline, such as a recursive deep learning model that detects and tracks one pedestrian per iteration, is above a real-time threshold, the client may compute the inference of that stage on a subset of the pedestrians that are in the visual field to meet a real-time constraint. In this example, the client may send an image associated with reduced processing on the client to the cloud, so that the cloud may detect a greater number of the pedestrians that are present in the environment of the client device.

Furthermore, event triggers may be based on the presence of certain objects in the environment of the client device. For example, when an event-triggering object is detected at the client, the client may send the images to the cloud for more detailed processing. Likewise, when an event-triggering object is detected at the cloud, the cloud may request that the client send higher resolution images associated with the detected object. In another embodiment of the aforementioned method of joint client and cloud processing, the client may be configured to detect the presence of cars. Upon detection of a car, the client may send associated data frames to the cloud. The data frames may facilitate counting the number of cars, measuring the speed of cars at a particular location, and the like.

According to certain aspects of the present disclosure, event triggers may be controlled by the second device, which may reside in the cloud. The embedded device may be considered a client device and may receive an event trigger from a second device that may reside in the cloud. The embedded device may process a group of frames and send some contextual information to the cloud. Based on this contextual information, the cloud may control whether the video (and other associated data) from that group of frames (or a subset of that group of frames) should be communicated to the cloud. The cloud may further process this group of frames for fine grained information or may store it for future retrieval and analysis.

In addition, the second device, which may be a cloud server, may dynamically control bandwidth utilization by controlling the number of event triggers. In this example, the client device may be configured to send a video to the cloud whenever an event is detected in the environment. In some cases, there more events triggered that may be desired. According to certain aspects of the present disclosure, the second device may modify an event detection criterion, for example, and thereby modify the number and/or rate of triggered events.

According to aspects of the present disclosure, the client may use spatial sub-sampling to leverage computational resources of the cloud. In an embodiment that includes spatial sub-sampling, the client may use an inference engine to determine the top 30 locations where an object of interest may be present. The client may then create 30 crops of the image associated with those thirty locations, and send the cropped images to the cloud so that the cloud may determine in parallel whether the object of interest is present in each of the images.

In another embodiment, the cloud may process a full image. For example, the cloud may find all of the locations at which an object of interest in present in the visual field. In this example, the client may process the inference engine only on areas of the visual field identified by the cloud. Likewise, the client inference engine may assign a higher priority or frequency on the areas identified by the cloud. In this example, the cloud may be configured to finding the object locations while the client is configured to track the identified objects at or near the locations identified by the cloud.

According to aspects of the present disclosure, a client may do a full image search at a lower resolution than was obtained at the sensors, such as 640×480 pixel resolution. The client may perform object tracking on the reduced resolution image. Concurrently, the cloud may perform a full image search at a higher resolution, such as 1920×1280 or 4096×3072. This configuration may enable the cloud to perform complementary functions. For example, the cloud may locate smaller objects in the visual field that correspond to objects at a farther distance from the client device. The client may then track the objects using their appearance at a lower resolution and the locations identified by the cloud. In this example, the client retains the ability to locate and start tracking closer up objects, which may be associated with shorter latency constraints in a moving vehicle application.

In another embodiment, a client device, which may be a drone, may be configured to process an inference engine, such as an anomaly detector. The anomaly detector may be specified with a desired recall rate and, mis-detect rate. During operation, the device may exhibit a lower than desired precision or a higher than desired false alarm rate. In this example, when an object is detected on the client, the frame or a part of the frame may be sent to the cloud for inference, as the cloud may have the resources to perform inferences that outperform the recall and precision performance of the client. The result may then be sent back to the client.

In an embodiment of the present disclosure directed to drone analytics, a drone autopilot may be flying a coarse pattern over a site, such as an agricultural field or a roof of a building. The client device may be configured to analyze sensor data for anomalies or issues. If the drone client detects an anomaly, then it may sample the associated area of the site with a denser or closer up flying pattern to get higher resolution data or data from more angles. With increased sampling, the system may better analyze the anomaly. In this example, the drone may send a subset of frames to the cloud. The cloud may use a different model and may send back additional indications of anomalous areas for finer sampling. Alternatively, a real-time anomaly detection may be done at the cloud, and the drone may match the identified areas with GPS and visual processing indications to return to the area for denser sampling. This configuration may enable faster analysis of a site as the drone may fly quickly over most areas where there are no anomalies, and still obtain more detailed information on detected anomalous areas by flying closer. Since the processing of anomalous areas may occur in real-time, the drone may alter its flight pattern and thus avoid having to return later or fly a subsequent time.

Cloud Aided Unsupervised Learning

Supervised learning of inference models, such as deep neural networks, may benefit from a large set of labeled data. Aspects of the present disclosure may be directed to creating a large set of labeled by using client sourced training data. In one embodiment, there may be a cloud model that is trained to high accuracy and that generalizes well. Furthermore, there may be a client model that is sized to be a real-time embedded model. During operation of the aforementioned method of joint processing on an embedded device and a second device, a client may send a subset of data frames along with classification results to the cloud. The cloud may then classify the frames using the cloud model. The cloud may determine that a classifications based on the cloud model of at least one of the images is different from the classification based on the client model that was sent from the client along with the image. In this example, the cloud may use such identified images, perhaps in conjunction with other training data already at the cloud, to create an updated training set. With the updated training set, the cloud may create a new model for the embedded device, and may send the updated model to the client.

The previous example described an embodiment in which a single client sends data frames and classifications to the cloud, but the present disclosure is not so limited. The cloud server may receive data frames and classifications from multiple clients. The cloud may iteratively improve the client models based on the received data. The improved client models may include general-purpose inference models as well as context specific models.

Furthermore, the cloud may use unsupervised feature learning by creating a training dataset from client supplied unlabeled data. In this example, the cloud may pre-train a real-time client model as an auto-encoder or Restricted Boltzmann Machine. The cloud may subsequently train or fine-tune the model with supervised labeled training data. In addition, training examples that are difficult to classify or that are classified in a manner that is not associated with a high confidence may be selected so that humans may add labels or may verify or correct labels.

In another embodiment, a client device may update its model by running a learning algorithm to update its own weights, but may update its own weights according to labels provided by the cloud. In addition, soft-target labels or activations may be sent from the cloud and used for back propagation in a neural network inference engine on the device.

Reinforcement Learning

Aspects of the present disclosure may be directed to utilizing a large set of unlabeled data in the cloud using reinforcement learning. Reinforcement learning algorithms may be trained on a set of images combined with actions and scores. The training set may be shuffled in a random order. Deep Neural Networks may be used to predict the scores for reinforcement learning algorithms. Scores may be applied based on discounting actual scores to earlier frames. In an embodiment of the present disclosure that involves a drone or car auto-pilot, reinforcement learning may be used in a crowd sourced manner to improve performance of an action engine. In this example, client drones or cars may collect data while running autonomously or while being controlled by a human driver or pilot. Penalty scores may be based, for example, on detecting that the client gets closer than a threshold to another car, that fast breaking is applied, that a crash or accident occurs, and the like. Data frames associated with these events may be sent to the cloud where reinforcement algorithms utilize the frames to update an action model.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of joint processing for data inference, comprising:
    processing first sensor data from a first sensor at a first device with a first model in a first vehicle to produce a first inference data, wherein the first device is proximate to the first sensor, and wherein the first sensor data were captured at a first time when the first vehicle was at an identified geographical region of interest;
    sending first communication data based on the first sensor data to a cloud device;
    processing the first communication data at the cloud device with a second model to produce a cloud inference data, wherein the cloud inference data comprises an object at the identified geographical region of interest; and
    responsive to predicting that a second vehicle will enter the identified geographical region of interest, sending, based at least in part on a location of the second vehicle and the identified geographical region of interest, cloud communication data based on the cloud inference data from the cloud device to a second device in the second vehicle to combine the cloud inference data with the first inference data to update the first model of the second vehicle in view of the object at the identified geographical region of interest.

2. The method of claim 1, wherein the first inference data comprises an estimate of the identified geographical region, wherein the estimate is based on GPS data from a GPS sensor coupled to the first device.

3. The method of claim 1, wherein the first sensor is a camera coupled to the vehicle and having a view of an exterior of the vehicle, wherein the first sensor data comprises an image captured by the camera at the first time, and wherein the first inference data comprises a detection of an object in the image.

4. The method of claim 3, wherein the cloud inference data comprises an estimate of the identified geographical region, wherein the estimate of the identified geographical region is based at least in part on the detection of the object in the image.

5. The method of claim 3, wherein the first communication data is sent to the cloud device in response to the detection of the object.

6. The method of claim 5, wherein the first communication data comprises the image, and wherein the processing of the first communication data at the cloud device comprises processing the image with more detailed processing in comparison to the processing at the first device.

7. The method of claim 1, wherein the cloud inference data further comprises a detection of an anomaly.

8. The method of claim 1, wherein the first inference data comprises a detection of an object from the first sensor data, and wherein the detection of an anomaly in the cloud inference data comprises a detected change in a spatial location of the object.

9. The method of claim 1, wherein cloud communication data is sent to the second device in the second vehicle in response to a determination that the second vehicle was recently located within the identified geographical region of interest, such that a memory unit coupled to the second device is expected to contain recorded sensor data associated with the identified geographical region of interest.

10. The method of claim 1, further comprising:
processing second sensor data from a second sensor at the second device in the second vehicle to produce a second inference data, wherein the second device is proximate to the second sensor, wherein the second sensor data were captured at a second time when the second vehicle was at a second location.

11. The method of claim 10, wherein the processing of the second sensor data by the second device is performed in response to a determination that the second location is within the identified geographical region of interest.

12. The method of claim 10, further comprising:
sending, based on the second inference data, second communication data to the cloud device, wherein the second communication data comprises sensor data associated with the identified geographical region of interest.

13. The method of claim 1, further comprising:
receiving second sensor data from a second sensor at the second device in the second vehicle, wherein the second device is proximate to the second sensor, and wherein the second sensor data were captured at a second time when the second vehicle was at a second location; and
sending second communication data based on the second sensor data to the cloud device.

14. A system for joint processing for data inference, comprising:
a first device, wherein the first device is embedded in a first vehicle and proximate to a first sensor, and wherein the first device is configured to process first sensor data from the first sensor with a first model to produce a first inference data, wherein the first sensor data were captured at a first time when the vehicle was at a first location an identified geographical region of interest;
a cloud device, wherein the first device is further configured to send first communication data based on the first sensor data to the cloud device; and wherein the cloud device is configured to process the first communication data with a second model to produce a cloud inference data, wherein the cloud inference data comprises an identified geographical region of interest; and
a second device, wherein the second device is embedded in a second vehicle, and wherein the cloud device is further configured to send cloud communication data to the second device based at least in part on a location of the second vehicle and the identified geographical region of interest, responsive to predicting that the second vehicle will enter the identified geographical region of interest, to combine the cloud inference data with the first inference data to update the first model of the second vehicle in view of the object at the identified geographical region of interest.

15. The system of claim 14, wherein the cloud inference data further comprises a detection of an anomaly.

16. The system of claim 14, wherein the first inference data comprises a detection of an object from the first sensor data, and wherein the detection of an anomaly in the cloud inference data comprises a detected change in a spatial location of the object.

17. A computer program product for joint data inference on an edge device and a cloud device, the computer program product comprising:
a non-transitory computer-readable medium having program code recorded thereon, the program code comprising program code to cause a processor on the edge device to:
process first sensor data from a first sensor at the device in a first vehicle with a first model to produce a first inference data, wherein the edge device is proximate to the first sensor, and wherein the first sensor data were captured at a first time when the first vehicle was at an identified geographical region of interest;
send first communication data based on the first sensor data to the cloud device; and
the program code comprising program code to cause a processor on the cloud device to:
process the first communication data at the cloud device with a second model to produce a cloud inference data, wherein the cloud inference data comprises an identified geographical region of interest; and
responsive to predicting that a second vehicle will enter the identified geographical region of interest, send, based at least in part on a location of the second vehicle and the identified geographical region of interest, cloud communication data based on the cloud inference data from the cloud device to a second device in the second vehicle to combine the cloud inference data with the first inference data to update the first model of the second vehicle in view of the object at the identified geographical region of interest.

* * * * *

UNITED STATES PATENT AND TRADEMARK OFFICE
CERTIFICATE OF CORRECTION

| | |
|---|---|
| PATENT NO. | : 12,056,623 B2 |
| APPLICATION NO. | : 17/670189 |
| DATED | : August 6, 2024 |
| INVENTOR(S) | : David Jonathan Julian et al. |

It is certified that error appears in the above-identified patent and that said Letters Patent is hereby corrected as shown below:

In the Claims

Column 21, Line 29-35, In Claim 14 should read:
--a first device, wherein the first device is embedded in a first vehicle and proximate to a first sensor, and wherein the first device is configured to process first sensor data from the first sensor with a first model to produce a first inference data, wherein the first sensor data were captured at a first time when the vehicle was at an identified geographical region of interest;--

Signed and Sealed this
Third Day of September, 2024

*Katherine Kelly Vidal*

Katherine Kelly Vidal
*Director of the United States Patent and Trademark Office*